(12) United States Patent
Brown et al.

(10) Patent No.: US 6,960,316 B2
(45) Date of Patent: Nov. 1, 2005

(54) INJECTION-MOLDED PLASTIC CONTAINER OR CLOSURE WITH TURNED-UNDER RIM AND METHOD OF INJECTION-MOLDING SAME

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 84 days.

(21) Appl. No.: 10/283,979

(22) Filed: Oct. 30, 2002

(65) Prior Publication Data

US 2004/0084459 A1 May 6, 2004

(51) Int. Cl.[7] ............................................. B29C 45/00
(52) U.S. Cl. .................. 264/328.1; 220/659; 264/334
(58) Field of Search ............................... 220/656–659; 264/328.1, 334

(56) References Cited

U.S. PATENT DOCUMENTS

| | | | |
|---|---|---|---|
| 3,001,683 A | 9/1961 | Goodwin et al. | |
| 3,194,468 A | 7/1965 | Baron | |
| 3,836,042 A | 9/1974 | Petitto | |
| 3,915,613 A | 10/1975 | Ruch | |
| 4,111,303 A | 9/1978 | Compton | |
| 4,124,120 A | 11/1978 | Day | |
| 4,286,766 A * | 9/1981 | von Holdt | 249/144 |
| 4,316,540 A | 2/1982 | Lapham | |
| 4,373,634 A * | 2/1983 | Edwards | 206/520 |
| 5,226,586 A | 7/1993 | Grone | |
| 5,766,536 A * | 6/1998 | Felder | 264/297.1 |
| 5,766,655 A * | 6/1998 | Tajiri et al. | 425/556 |
| 5,833,912 A * | 11/1998 | Schweigert et al. | 264/318 |
| 6,187,247 B1 * | 2/2001 | Buzzell et al. | 264/334 |
| 6,241,931 B1 * | 6/2001 | Ciccone et al. | 264/318 |
| 6,521,165 B2 * | 2/2003 | Rick | 264/334 |

* cited by examiner

*Primary Examiner*—Joseph C. Merek
(74) *Attorney, Agent, or Firm*—Edward W. Callan

(57) ABSTRACT

An injection-molded plastic container or closure has a sidewall extending from a base wall to a rim wall. An upper portion of a segment of the rim wall extends with both outward and inward directional components. A lower portion of the given segment extends with both downward and inward directional components; and at a given level of the lower portion, the given segment has an inner surface and an outer surface that each extend with downward and inward directional components. At the given level the inner surface and the outer surface of the lower portion are respectively formed by different mold components of one of the mold parts. Upon removal of the container or closure from the mold parts, the inner surface and the outer surface of the lower portion at the given level of the given segment are contemporaneously removed from one of the separated mold parts.

10 Claims, 9 Drawing Sheets

US 6,960,316 B2

INJECTION-MOLDED PLASTIC CONTAINER OR CLOSURE WITH TURNED-UNDER RIM AND METHOD OF INJECTION-MOLDING SAME

BACKGROUND OF THE INVENTION

The present invention generally pertains to plastic containers and closures and methods of injection-molding such containers and closures and is particularly directed to an improvement in an extended rim of such an injection-molded container or closure and the related injection-molding method.

Plastic containers, such as drinking cups having extended rims, are well known. An example of such a container and the method of injection-molding such container are described in European Patent Application Publication EP 1 174 238 A1. The extended rim is turned under to enhance the use of the container as a drinking cup. However, in order to facilitate removal of the injection-molded container from the mold parts, the turned-under rim terminates at a circumferential edge that does not always feel smooth to a person's lips.

SUMMARY OF THE INVENTION

The present invention provides a method of cyclic injection molding a plastic container or closure having a sidewall extending with at least an upward directional component from a base wall to a rim wall, wherein at least an upper portion of a given at least partially perimetric segment of the rim wall extends with both an outward directional component and a downward directional component; wherein at least a lower portion of the given segment of the rim wall extends with at least a downward directional component and an inward directional component; and wherein, at a given level of the lower portion, the given segment has an inner surface and an outer surface that each extend toward the sidewall with at least an inward directional component.

In one embodiment of the present invention, in which an injection-molded plastic container manufactured according to the present invention is used as a drink cup, the rim wall can be turned under sufficiently that the rim feels smoother to a person's lips.

In another embodiment, in which an injection-molded plastic container or closure manufactured according to the present invention is handled, the rim wall can be turned under sufficiently that the rim feels smoother to a person's hands.

The present invention provides a method of cyclic injection molding the above described plastic container or closure in such a manner that the injection-molded container or closure can be removed from the mold parts. The method comprises the steps of:

(a) providing a mold cavity between first and second mold parts for forming the container or closure;

(b) injecting fluid plastic material into the mold cavity to form the container or closure;

(c) separating the first and second mold parts; and (d) removing the container or closure from the separated mold parts, wherein step (d) comprises contemporaneously removing the inner surface and the outer surface of the lower portion of the rim wall segment at the given level from one of the separated mold parts.

In another aspect, the present invention provides a method of cyclic injection-molding a plastic container or closure having a base wall, a rim wall and sidewall extending with at least an upward directional component from the base wall to the rim wall, the method comprising the steps of:

(a) providing a mold cavity between first and second mold parts for forming the container or closure;

(b) injecting fluid plastic material into the mold cavity to form the container or closure:

(c) separating the first and second mold parts; and (d) removing the container or closure from the separated mold parts, wherein step (a) comprises shaping the mold cavity to form a given at least partially perimetric segment of the rim wall, wherein at least an upper portion of the given segment extends with both an outward directional component and a downward directional component; wherein at least a lower portion of the given segment extends with at least a downward directional component and an inward directional component; and wherein, at a given level of the lower portion, the given segment has an inner surface and an outer surface that each extend with at least an inward directional component; and wherein step (d) comprises contemporaneously removing the inner surface and the outer surface of the lower portion of the given segment at the given level from one of the separated mold parts.

Additional features of the present invention are described with reference to the detailed description of the preferred embodiments.

DETAILED DESCRIPTION

Figure 1:
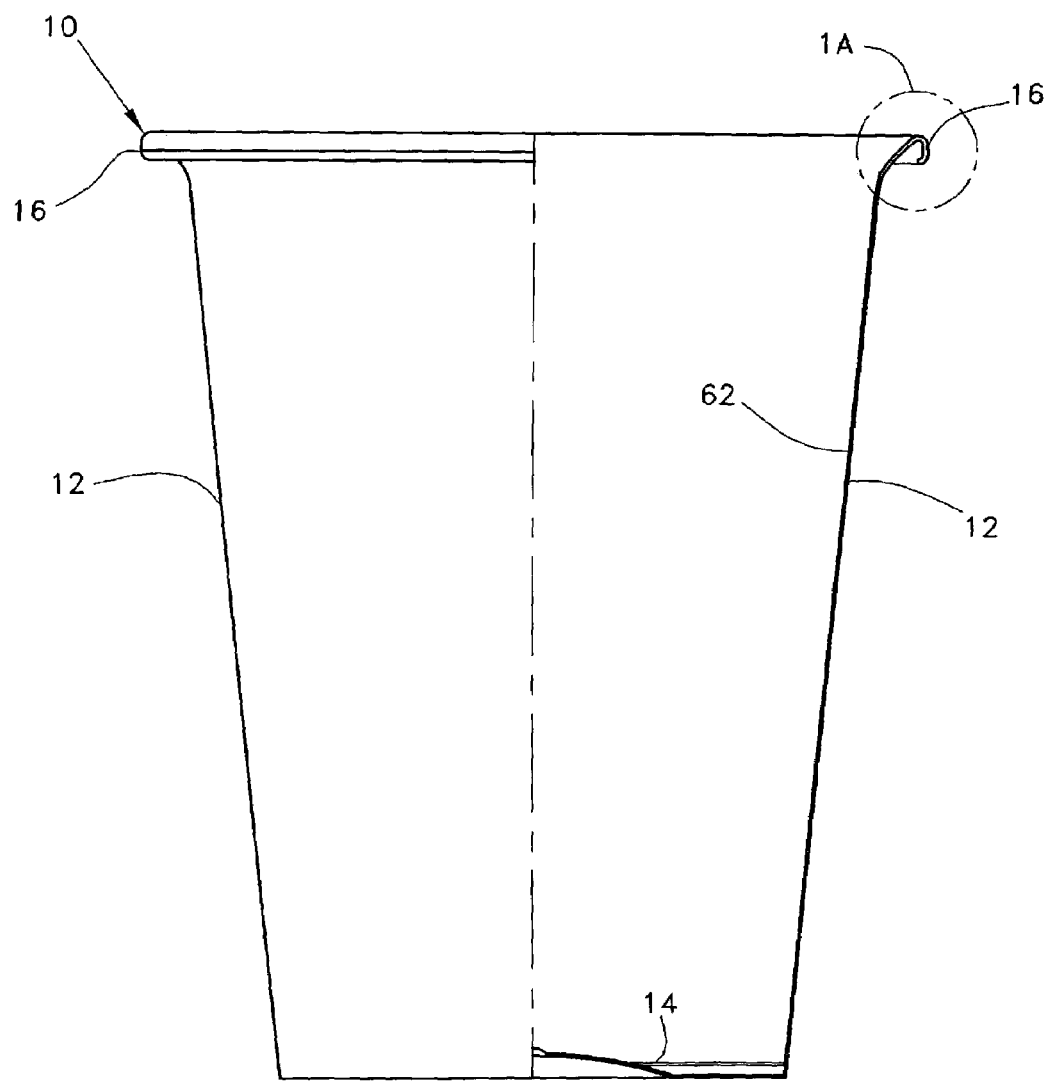
FIG. 1 is a partially cut-away side view of a preferred embodiment of a container according to the present invention.
Figure 1A:
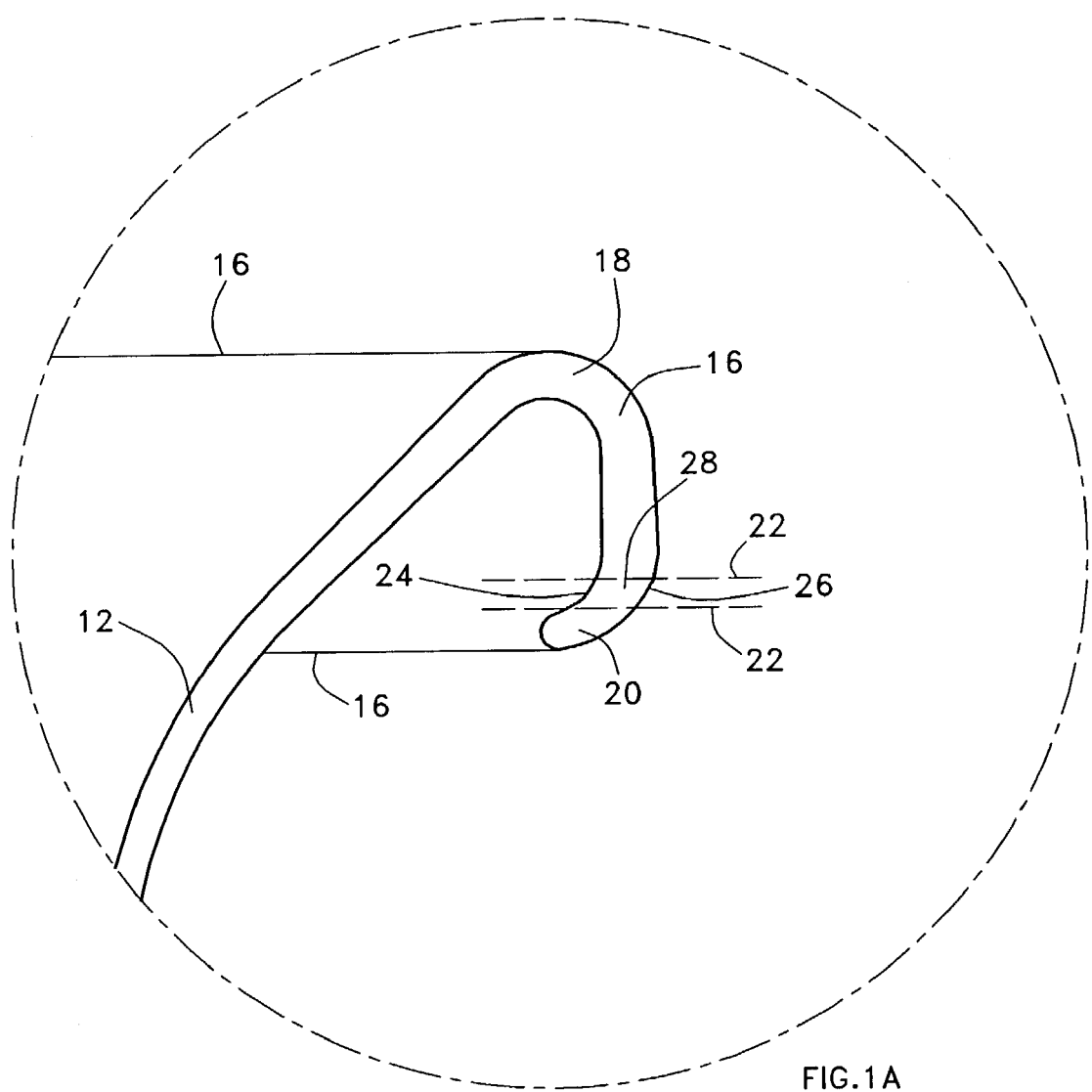
FIG. 1A is an enlarged view of the encircled portion 1A of the container of FIG. 1.
Figure 2:
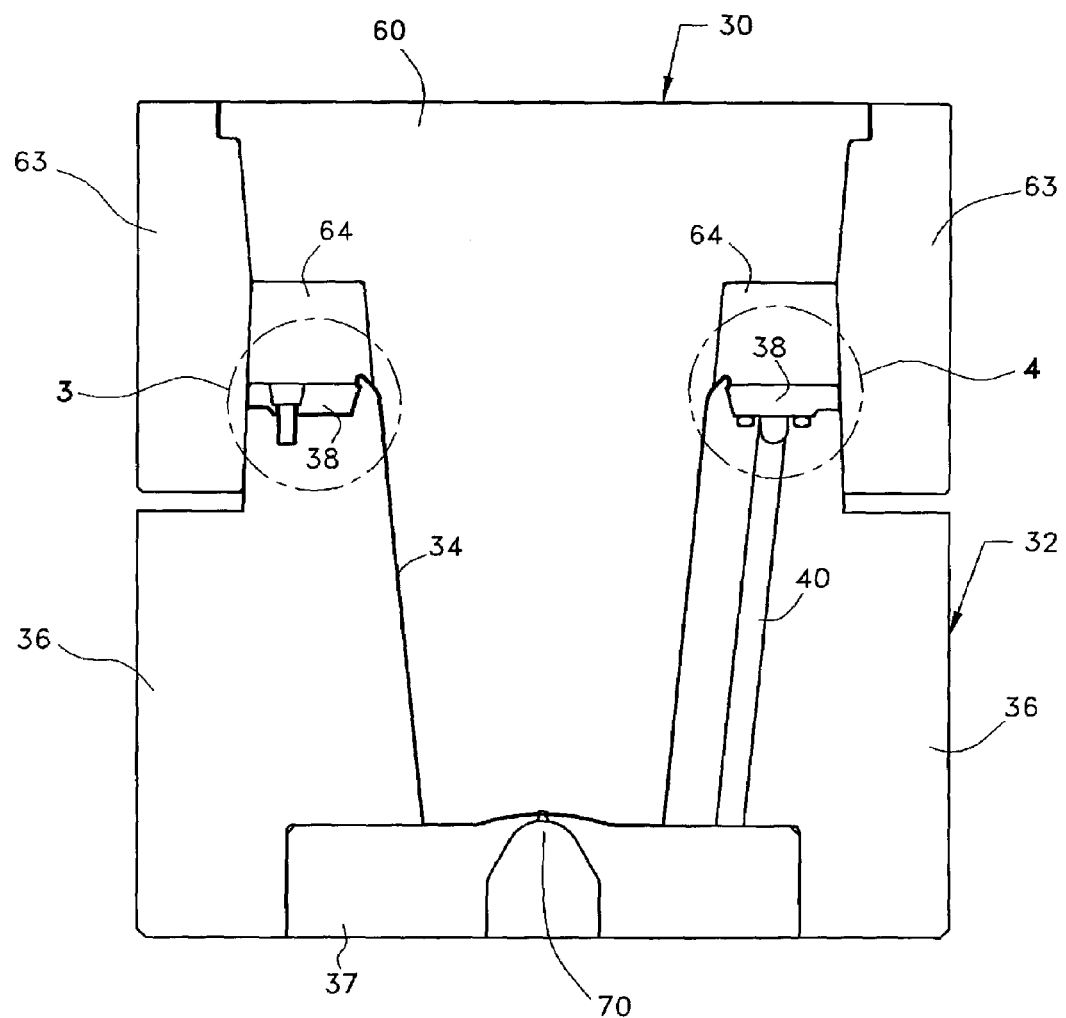
FIG. 2 is an angular sectional view of a preferred embodiment of a mold used for injection molding the container of FIG. 1 according to the method of the present invention. This view is taken along line 2—2 in FIG. 5.

Referring to FIGS. 1 and 1A, a preferred embodiment of a container 10 according to the present invention includes a sidewall 12 extending with at least an upward directional component from a base wall 14 to a rim wall 16. At least an upper portion 18 of a given at least partially perimetric segment of the rim wall 16 extends with both an outward directional component and a downward directional component. A lower portion 20 of the given segment of the rim wall 16 extends with both a downward directional component and an inward directional component.

At a plurality of given levels 22 of the lower portion 20 above the base wall 14, the given segment has an inner surface 24 and an outer surface 26 that each extend toward the sidewall 12 with both a downward directional component and an inward directional component. In an alternative embodiment (not shown), at one or more such given levels 22 of the lower portion 20 the inner surface 24 and/or the outer surface 26 of the given segment extends toward the sidewall 12 with only an inward directional component.

In another alternative embodiment (not shown), at one or more such given levels 22 of the lower portion 20, the inner surface 24 and/or the outer surface 26 of the given segment does not extend toward the side wall but does extend with both an inward component and a downward component.

A given section 28 of the lower portion 20 between two such given levels 22 extends toward the sidewall 12 with a non-increasing thickness. Preferably, the given section 28 of the lower portion 20 of the given segment extends toward the sidewall 12 with a decreasing thickness.

In the preferred embodiment, the given segment of the rim wall 16 is circumferential to enhance the use of the container 10 as a drink cup. In an alternative embodiment (not shown), such as when the container is shaped for use as pitcher, the given segment is only partially circumferential.

Referring to FIGS. 2, 3, 3A, 3B, 4 and 5, a preferred embodiment of a mold for cyclic injection molding the container of FIG. 1 includes a core mold part 30 and a cavity mold part 32, which, when combined, provide a mold cavity 34 therebetween for forming the container of FIG. 1. In view of an undercut in mold cavity 34 incident to the turned-under lower portion 20 of the rim wall 12, it is preferable that the cavity mold part 32 be assembled with separate cavity-part components 36, 38 on opposite sides of the portion of the mold cavity 34 that forms the turned-under lower portion 20 of the rim wall 12.

Accordingly, in addition to a primary cavity-part component 36 that forms a major portion of one side of the mold cavity 34, including the portion thereof that forms the inner surface 24 of the lower portion 20 of the rim wall 16, and a base-wall cavity-part component 37, the cavity mold part 32 includes at least two cavity-part components 38 for forming the outer surface 26 of the lower portion 20 of the rim wall 16 in at least the section 28 between the two given levels 22 to enable assembly of the cavity mold part 32. Although FIG. 5 suggests the utilization of four quarter-circular lower-rim-wall-outer-surface-forming cavity-part components 38 to enable assembly of the cavity mold part 32, it is preferred that either two semi-circular or three 120-degree such components 38 be so utilized; and in other embodiments, some other number of such components 38 can be utilized, and/or not all of such components 38 are of the same degree.

In the illustrated preferred embodiment, the primary cavity-part component 36 includes waterways 40 for enabling cooling of the cavity mold part 32. Pairs of waterways 40 are interconnected by grooves 42. The lower-rim-wall-outer-surface-forming cavity-part components 38 cover the openings to the waterways 40 and the grooves 42. O-rings 46 are disposed to seal the lower-rim-wall-outer-surface-forming cavity-part components 38 to the primary cavity-part component 36 so that water flows only between the interconnected waterways 40. The lower-rim-wall-outer-surface-forming components 38 are secured to the primary cavity-part component 36 by screws 46 that extend into threaded holes 48. The counter bore 50 of each of the threaded holes 48 and each of the heads of the screws 46 are conical to prevent flashes of injected plastic material from entering the spaces therebetween.

Figure 3:
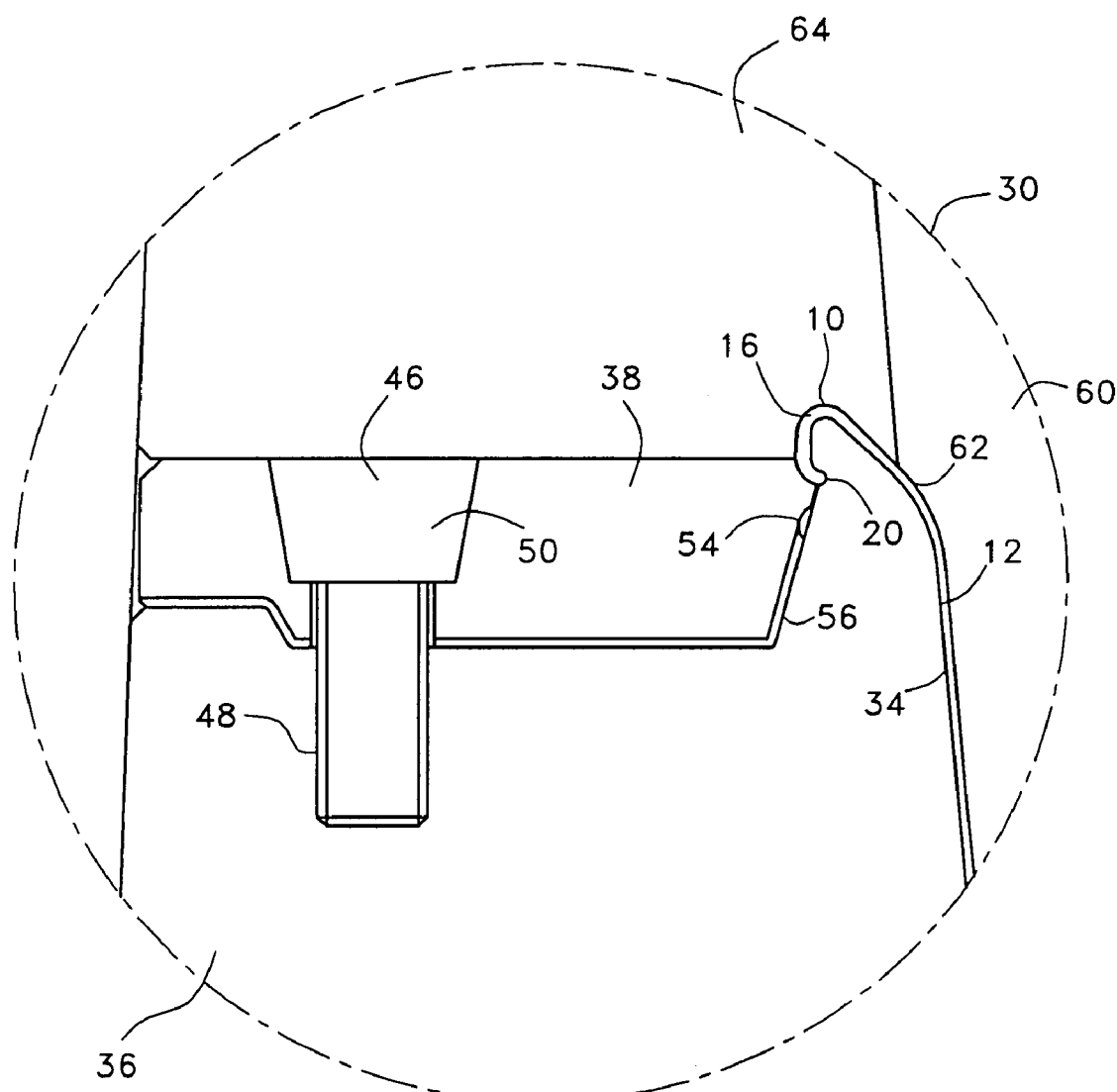
FIG. 3 is an enlarged view of the encircled portion 3 of the mold of FIG. 2.
Figure 4:
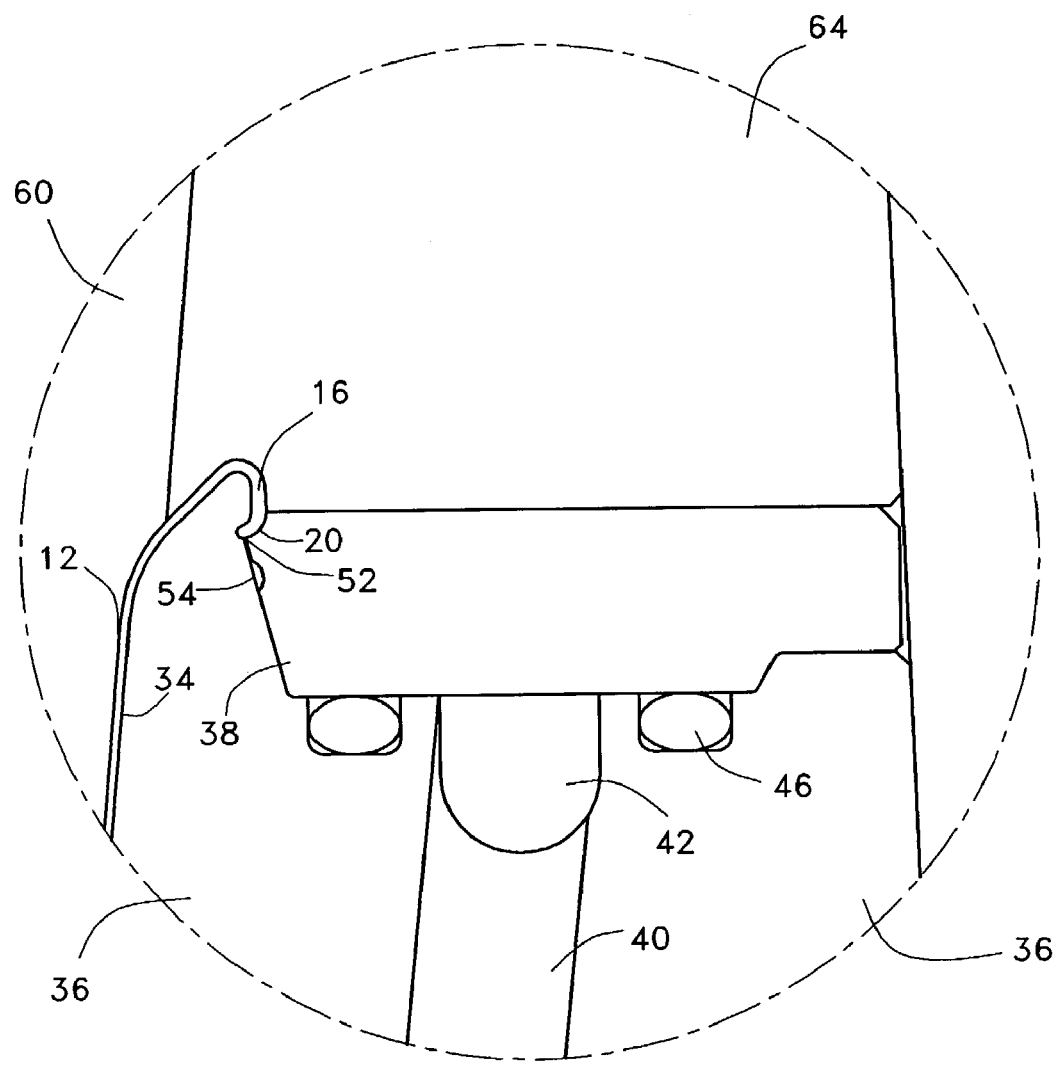
FIG. 4 is an enlarged view of the encircled portion 4 of the mold of FIG. 2.
Figure 5:
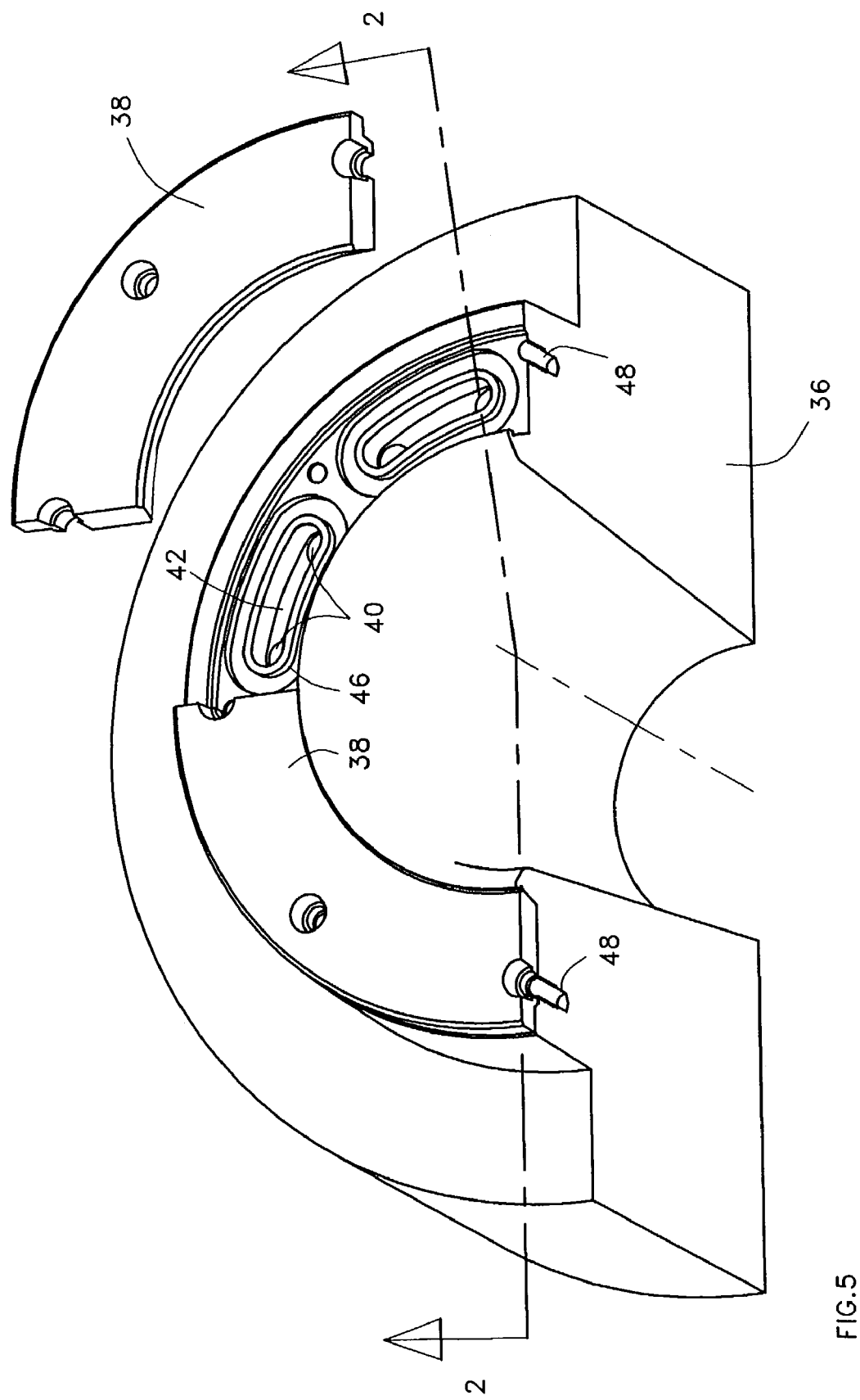
FIG. 5 is a partially broken-away perspective view of the components of the cavity mold part of the mold of FIG. 2.

There is an air gap 52 between the lower-rim-wall-outer-surface-forming cavity-part components 38 and the primary cavity-part component 36 of the cavity mold part 32. This air gap 52 has a width in the range of 0.0004 and 0.0006 inch. When plastic material is injected into the mold cavity 34, air within the mold cavity 34 is forced under pressure into the air gap 52, as shown in FIG. 4. A circumferential groove 54 is provided between the primary cavity-part component 36 and the lower-rim-wall-outer-surface-forming cavity-part components 38 adjacent the air gap 52. Referring to FIG. 3, air passages 56 extend from the groove 54 via each of the threaded holes 48 to the atmosphere to thereby relieve the air pressure within the air gap 52. The circumferential groove 54 and the air passages 56 each are approximately $\frac{1}{16}$ inch wide and $\frac{1}{32}$ inch deep.

The core mold part 30 includes a primary core-part component 60 that forms a major portion of the other side of the mold cavity 34, including the portion thereof that forms the inner surface 62 of the sidewall 12. The core mold part 30 also includes a circular locking ring 63 and a circular stripper ring 64 that forms the outer surface of the upper portion 18 of the rim wall 16. The circular stripper ring 64 engages the upper portions of the cavity-part components 38 at the parting line between the mold parts 30, 32.

During each cycle of the injection-molding method of the present invention, the mold is closed to provide the mold cavity 34 between the core mold part 30 and the cavity mold part 32. Fluid plastic material is then injected into the mold cavity 34 via a gate 70 to form the container.

Figure 3A:
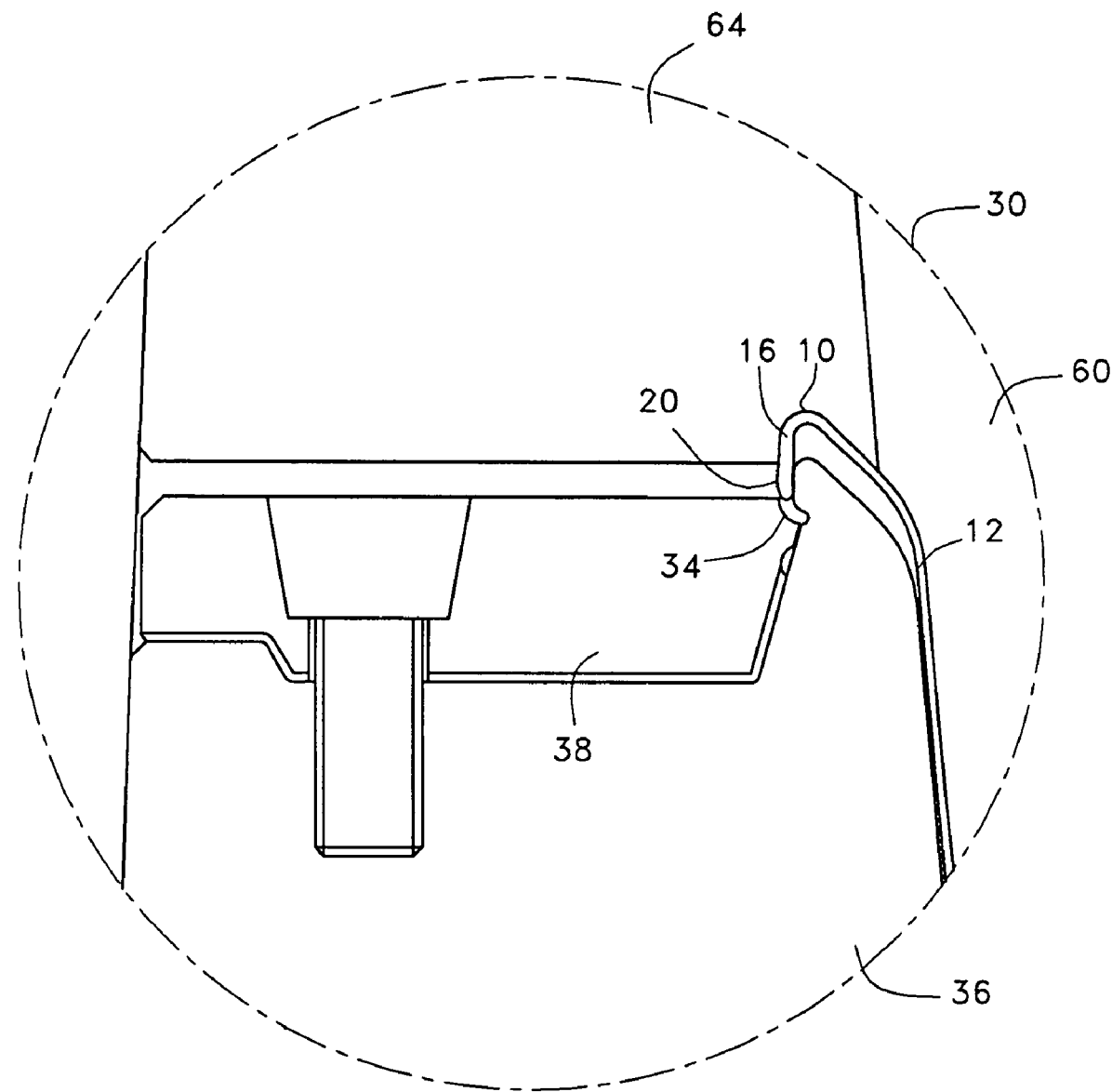
FIG. 3A is a view of one embodiment of the portion of the mold corresponding to FIG. 3, with the mold parts being partially separated to enable partial removal of the container from a mold part.

After the injected plastic material has cooled sufficiently, the core mold part 30 and the cavity mold part 32 are separated from one another, as shown in FIG. 3A. During the initial separation of the mold parts 30, 32, the container is retained in the core mold part 30 and thereby partially removed from the cavity mold part 32, as shown in FIG. 3A, whereupon the lower portion 20 of the rim wall 16 of the given segment flexes to enable removal from the undercut portion of the mold cavity 34 that forms the lower portion 20.

FIG. 3A shows the mold as partially open with the container 10 remaining on the core mold part 30. The mold then continues to open fully with the container 10 remaining on the core mold part 30. The stripper ring 64 then ejects the container 10 from the core mold part 30.

Figure 3B:
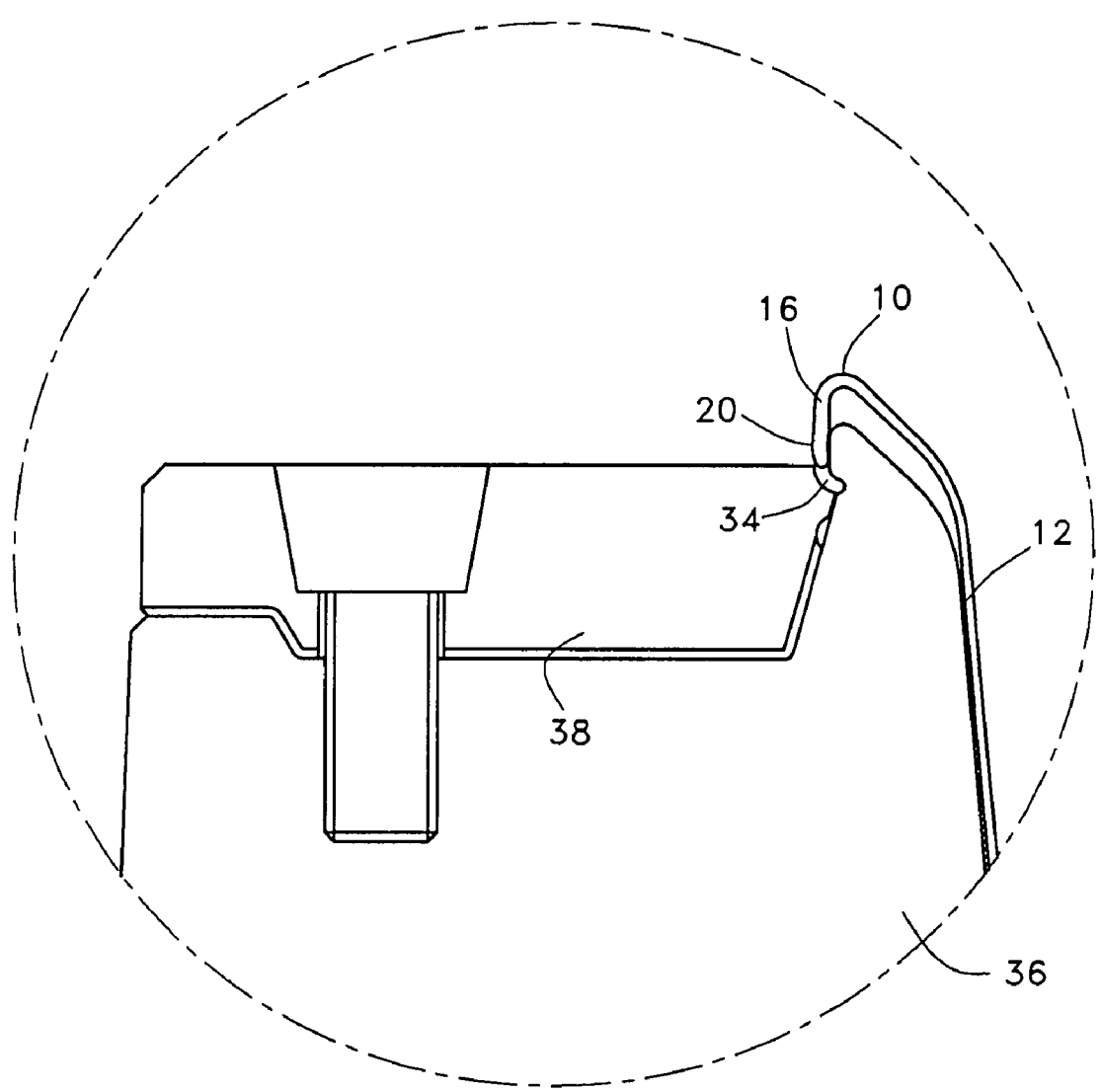
FIG. 3B is a view of another embodiment of the portion of the mold corresponding to FIG. 3, with the mold parts being fully separated to enable full removal of the container from the mold.

In a different embodiment, the core mold part 30 is separated from the cavity mold part 32 with the container 10 remaining in the cavity mold part 32. The container 10 is then ejected from the cavity mold part 32 by such means as air injection (not shown). FIG. 3B shows the container 10 as partially ejected from the cavity mold part 32. In this embodiment, the stripper ring does not need to more or to strip.

The inner surface 24 and the outer surface 26 of the lower portion 20 of the given segment at the given level 22 (shown in FIG. 1A) are contemporaneously removed from the cavity mold part 32 without having to move the lower-rim-wall-outer-surface-forming components 38 and the primary mold part 36 of the cavity mold part 32 relative to one another at any time during a molding cycle. Such removal is contemporaneous in that the period in which the inner surface 24 is removed from the cavity mold part 32 overlaps the period in which the outer surface 26 is removed from the cavity mold part 32.

The preferred method of injection molding the container of FIG. 1 is further described in the aforementioned European Patent Application Publication EP 1 174 238 A1 and in U.S. patent application Ser. No. 10/050,434 filed Jan. 15, 2002. Both applications were filed by the inventors of the present invention.

Figure 6:
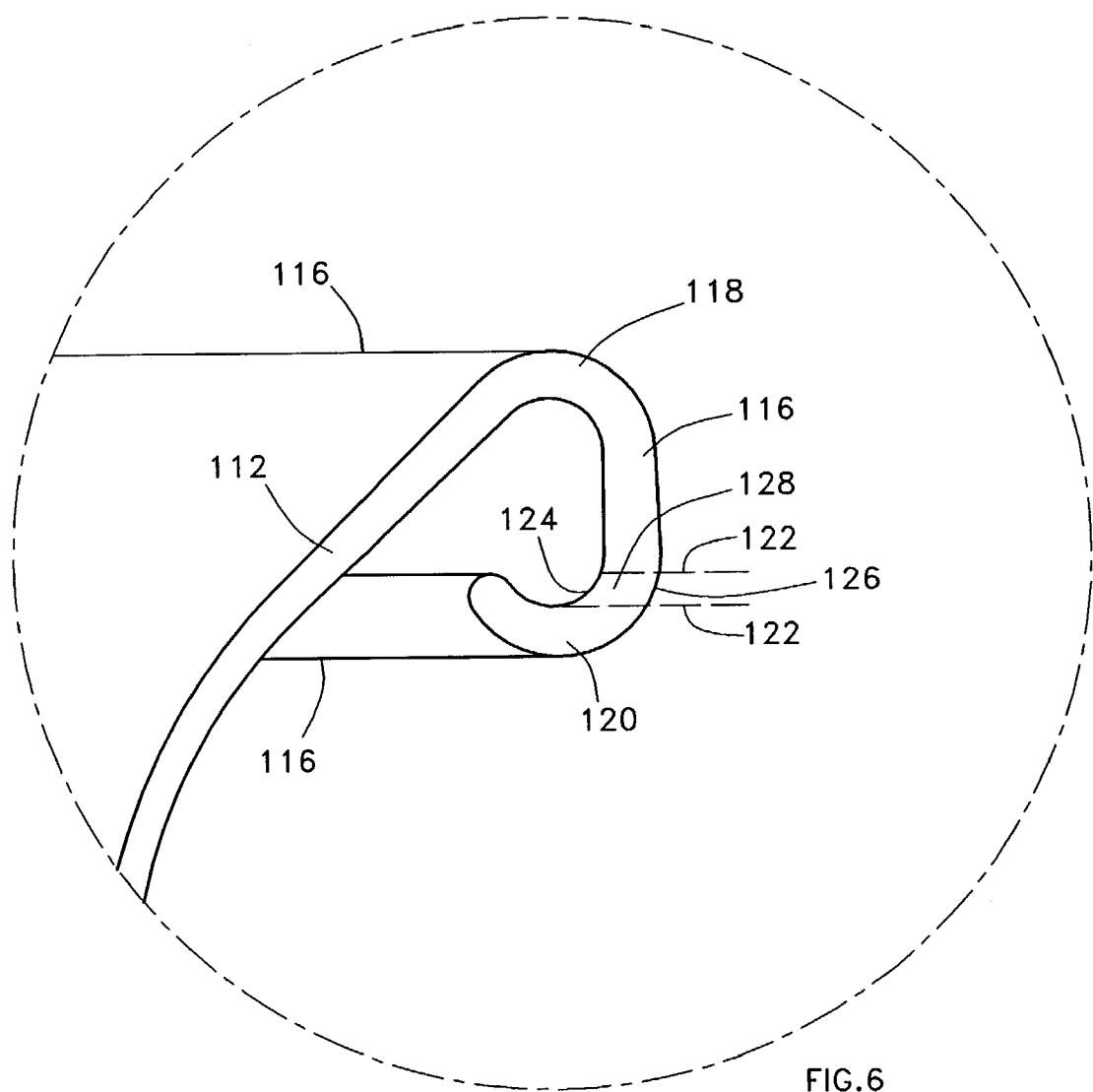
FIG. 6 is a view corresponding to that of FIG. 1A showing an alternative embodiment of the rim portion of a container according to the present invention.

In an alternative embodiment, the rim of the container is configured as shown in FIG. 6. At least an upper portion 118 of a given at least partially perimetric segment of the rim wall 116 extends with both an outward directional component and a downward directional component. A lower portion 120 of the given segment of the rim wall 116 extends with both a downward directional component and an inward directional component and then further extends with both an inward directional component and an upward directional component At a plurality of given levels 122 of the lower portion 120, the given segment has an inner surface 124 and an outer surface 126 that each extend toward the sidewall 112 with both a downward directional component and an inward directional component.

A given section 128 of the lower portion 120 between two such given levels 122 extends toward the sidewall 112 with a non-increasing thickness. Preferably, the given section 128 of the lower portion 120 of the given segment extends toward the sidewall 112 with a decreasing thickness.

The container of FIG. 6 is injection molded by using a mold and method such as described herein with reference to FIGS. 2, 3, 3A, 3B, 4 and 5.

Circular closures according to the present invention are injection molded in accordance with the foregoing teaching pertaining to containers as described herein with reference to FIGS. 1, 2, 3, 3A, 3B, 4, 5 and 6.

In other alternative embodiments (not shown), which may pertain to either closures or containers, the sidewall may be vertical; the sidewall, the base wall and the rim wall may be rectangular, polygonal and/or laminated; and/or the sidewall, the base wall and/or the rim wall may include handles, spouts, holes and/or ribs.

The benefits specifically stated herein do not necessarily apply to every conceivable embodiment of the present invention. Further, such stated benefits of the present invention are only examples and should not be construed as the only advantages of the present invention.

While the above description contains many specificities, these specificities are not to be construed as limitations on the scope of the present invention, but rather as examples of the preferred embodiments described herein. Other variations are possible and the scope of the present invention are to be determined not by the embodiments described herein but rather by the claims and their legal equivalents. The claims require no implicit limitations. Each claim is to be construed explicitly as stated, or by its legal equivalent.

We claim:

1. A method of cyclic injection-molding a plastic container or closure having a sidewall extending with at least an upward directional component from a base wall to a rim wall, wherein both an inner and outer surface of at least an upper portion of a given at least partially perimetric segment of the rim wall extend with both an outward directional component and a downward directional component; wherein at least a lower portion of the given segment of the rim wall extends with at least a downward directional component and an inward directional component; and wherein, at a given level of the lower portion above the base wall, the given segment has an inner surface and an outer surface that each extend with at least an inward directional component, the method comprising the steps of:
    (a) providing a mold cavity between first and second mold parts for forming the container or closure;
    (b) injecting fluid plastic material into the mold cavity to form the container or closure;
    (c) separating the first and second mold parts; and
    (d) removing the container or closure from the separated mold parts,
    wherein step (d) comprises contemporaneously removing the inner surface and the outer surface of the lower portion of the given segment at the given level from one of the separated mold parts.

2. A method according to claim 1, wherein at the given level the inner surface and the outer surface of the lower portion of the rim wall segment are respectively formed by different mold components of said one of the mold parts.

3. A method according to claim 2, wherein said different mold components are not moved relative to one another at any time during a molding cycle.

4. A method according to claim 2, wherein the respective component that forms the outer surface at the given level includes at least two separate components.

5. A method according to claim 1, wherein the given segment is circumferential.

6. A method of cyclic injection-molding a plastic container or closure having a base wall, a rim wall and sidewall extending with at least an upward directional component from the base wall to the rim wall, the method comprising the steps of:
    (a) providing a mold cavity between first and second mold parts for forming the container or closure;
    (b) injecting fluid plastic material into the mold cavity to form the container or closure:
    (c) separating the first and second mold parts; and
    (d) removing the container or closure from the separated mold parts,
    wherein step (a) comprises shaping the mold cavity to form a given at least partially perimetric segment of the rim wall, wherein both an inner and outer surface of at least an upper portion of the given segment extend with both an outward directional component and a downward directional component; wherein at least a lower portion of the given segment extends with at least a downward directional component and an inward directional component; and wherein, at a given level of the lower portion above the base wall, the given segment has an inner surface and an outer surface that each extend with at least an inward directional component; and
    wherein step (d) comprises contemporaneously removing the inner surface and the outer surface of the lower portion of the given segment at the given level from one of the separated mold parts.

7. A method according to claim 6, wherein at the given level the inner surface and the outer surface of the lower portion of the rim wall segment are respectively formed by different mold components of said one of the mold parts.

8. A method according to claim 7, wherein said different mold components are not moved relative to one another at any time during a molding cycle.

9. A method according to claim 7, wherein the respective component that forms the outer surface at the given level includes at least two separate components.

10. A method according to claim 6, wherein the given segment is circumferential.

* * * * *